United States Patent Office 2,927,129
Patented Mar. 1, 1960

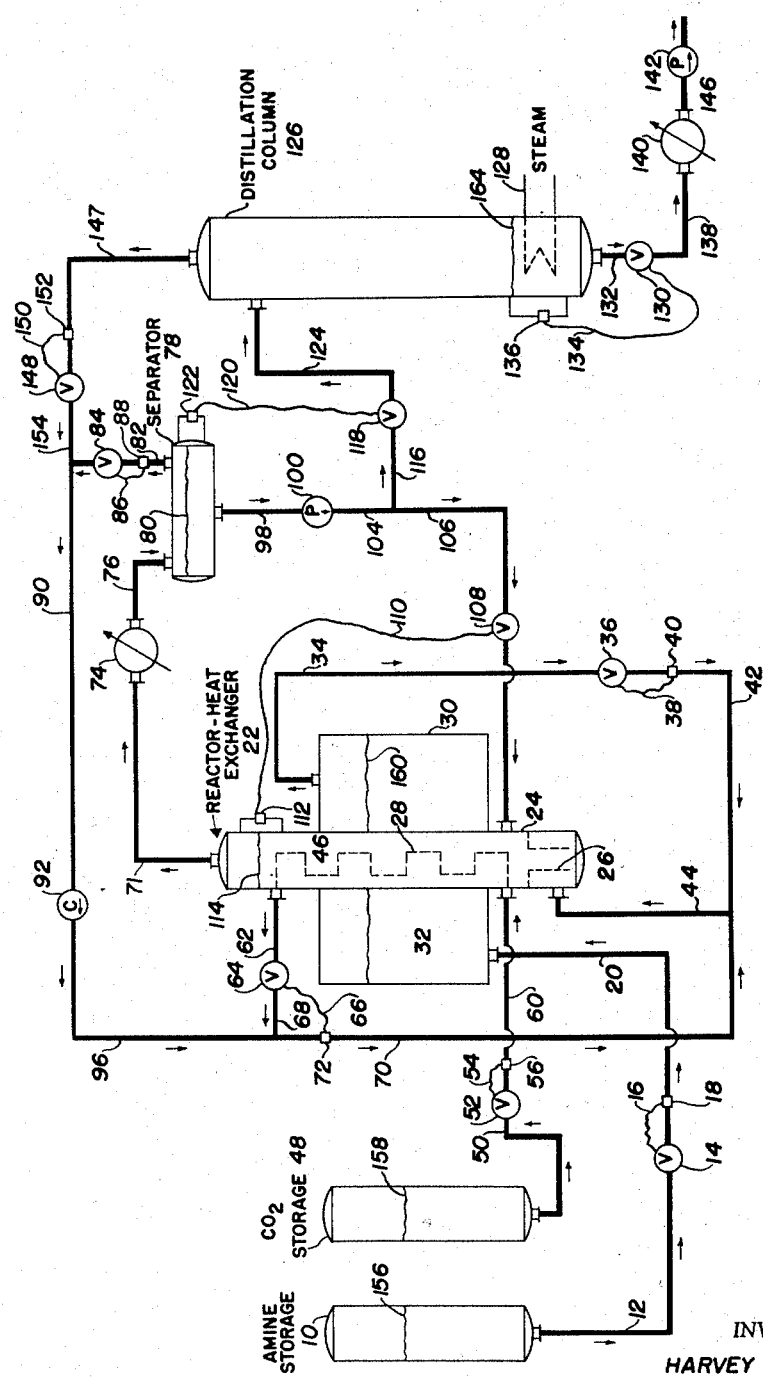

2,927,129

PRODUCTION OF DIMETHYLAMMONIUM DIMETHYL CARBAMATE

Harvey Hennig, Crystal Lake, and Harold A. Lindahl, Elmhurst, Ill., assignors to The Pure Oil Company, Chicago, Ill., a corporation of Ohio Application February 5, 1958, Serial No. 713,392

9 Claims. (Cl. 260—501)

This invention relates to certain improvements in the process technique and apparatus for conducting exothermic reactions between two or more reactants stored at high pressures. The invention relates more particularly to an improved, common, heat-exchanger system which utilizes the heat of the exothermic reaction mass.

A primary object of this invention is to provide a process for conducting exothermic reactions.

A second object of this invention is to provide an apparatus for conducting exothermic reactions.

Another object of this invention is to provide a process for effecting certan heat and cooling economies during the conduction of exothermic reactions.

Another object is to provide an apparatus for obtaining heat and cooling economies using normally gaseous reactants which enter into exothermic reactions.

Still a further object of this invention is to provide both a process and apparatus for the synthesis of dimethylammonium dimethylcarbamate from dimethylamine and carbon dioxide.

In accordance with this invention, it has been found that the placement of heat exchangers within and surrounding the reaction zone, in which exchangers the reactants can be brought to reaction temperature and thereafter expanded and combined within the reaction zone in an exothermic reaction, allows the controlled utilization of the heat of reaction to supply the energy requirements for the reactants. Representative of reactions which can be carried out in our process and apparatus is the production of liquid dimethyl ammonium dimethyl carbamate, in which gaseous carbon dioxide is reacted with gaseous dimethylamine at about atmospheric pressure. This reaction proceeds quantitatively at about 45° F.; however, by conducting the reaction at higher temperatures, that is, in the range of about 135–180° F., at pressures from atmospheric to 15–25 p.s.i.a., and preferably at 140–175° F. and atmospheric pressure, the benefits of this invention are obtained.

In accordance with this invention, the reactants, for which dimethylamine and carbon dioxide are used as examples, are supplied commercially as liquids in pressurized containers. In use, the reactants are expanded to an intermediate pressure somewhat greater than the atmospheric pressure of the reaction. Upon partial reduction of the pressure on the reactants, the temperature drops and the liquids are partially vaporized. The reactants remaining in the supply tanks became partially vaporized, and the remaining liquid phases undergo significant reductions in energy content. Accordingly, it has been found expedient to raise the temperature of the expanded reactants so that they are charged to the reaction zone at an intermedite temperature, e.g. about 70° F. Carbon dioxide is exemplary of reactants useful in our process and is supplied commercially in tanks at about 800 to 1100 lbs. per sq. inch absolute when at atmospheric temperature. In our process, the carbon dioxide is expanded from 950 lbs. per sq. inch absolute and 77° F. through a pressure-regulating valve operating to maintain a downstream pressure of 100 p.s.i.a., and the temperature falls to about −58° F. The gas is then warmed to about 120° F. and again expanded, this time to reaction conditions. During this last expansion very little change in temperature occurs. Similarly, dimethylamine is supplied commercially in tanks at 35 p.s.i.a. at about 77° F. and, in one embodiment of our invention, is expanded through a first-stage pressure-regulating valve to about 18 p.s.i.a., whereupon its temperature drops to about 57° F. The dimethylamine is then warmed to about 70° F. and is subsequently reduced to atmospheric pressure for transfer to the reaction zone.

In the present process, the chilled reactants are separately warmed by indirect heat exchange with the mass of reactants and products present in the reaction zone. This assists in the control of the reaction temperature and greatly decreases the requirements for externally supplied coolants. However, since the energy content of the reactants remaining in the storage tank decreases continuously because of depletion of the supply therein, and the resultant change in vapor/liquid volume ratio that occurs, provision is made for increasing the extent of heat exchange occuring in said reaction zone to assure a continued supply of reactants at constant temperatures and pressures.

The invention is best explained by reference to the attached drawing in which is shown a simplified flow diagram of the process incorporating the apparatus of this invention.

Referring to the flow diagram, the general relationship of the process equipment will be described first. Amine storage tank 10 is connected by line 12, controlled by pressure-reducing valve 14 (equipped with lead 16 and pressure-sensing element 18), and line 20 to combination reactor-heat-exchanger 22. Reactor-heat-exchanger 22 is equipped with a centrally located, elongated column 24 with baffle 26 located in the bottom thereof and heat exchanger coil 28 extending throughout its length. Column 24 is equipped with an outer heat exchanger jacket 30, which defines heat-exchange zone 32. Line 20 connects with zone 32. Amine leaving zone 32 enters line 34, controlled by flow-control valve 36 equipped with lead 38 and sensing element 40. Line 34 connects with line 42, which joins branch line 44 leading to the bottom of column 24 beneath baffle 26. Column 24 houses reaction zone 46 which contains coil 28.

Carbon dioxide storage tank 48 is connected with line 50 through pressure-control valve 52 (equipped with lead 54 and sensing element 56) and with line 60 which leads to the bottom portion of coil 28 in zone 46 of column 24. At the top, coil 28 connects with line 62, containing flow-control valve 64 (equipped with lead 66), which joins line 68. Line 68 connects with line 70, which joins with line 42 to form branch-line 44. The sensing element 72 for flow-control valve 64 is located in line 70.

Reaction zone 46 is connected by line 71 to cooler 74, which in turn is connected by line 76 to separator 78, having liquid level 80. Line 82 leads from the top vapor-zone of separator 78, through pressure-control valve 84 (equipped with lead 86 connected to sensing element 88), to line 90, which in turn leads to compressor 92 and through line 96, to line 70.

Liquid product from separator 78 passes through line 98, pump 100, and line 104 into line 106, which is connected to zone 46 of column 24. Liquid-level control-valve 108 (having lead 110 connected to liquid-level sensing-apparatus 112 which senses liquid-level 114 in column 24) is connected in line 106. Branch-line 116 leads from line 104 through liquid-level valve 118 (equipped with lead 120 and sensing element 122 in separator 78), and on through line 124 to distillation column 126. Column 126 is heated by steam-coil 128 and is equipped with liquid-level valve 130 in line 132. Valve 130 has lead 134 connected to sensing element 136 which is situated near the bottom of tower 126. From valve 130, liquid product bottoms flow through line 138, and pass through cooler 140 and pump 142 into line 146.

Overhead from column 126 passes through line 147 and pressure-control valve 148, equipped with lead 150 connected to sensing element 152 in line 147, and into line 154 which joins lines 82 and 90. The liquid level in pressure-tank 10 is indicated at 156, the liquid level in pressure-tank 48 is indicated at 158, and the liquid level in zone 32 is indicated at 160.

With reference to the drawing, the general processing steps are as follows. Dimethylamine is drawn from storage tank 10 through line 12, pressure-reducing valve 14, and line 20 to annular zone 32 of reactor-exchanger 22. Reducing valve 14 maintains the pressure within zone 32 at the vapor pressure of dimethylamine at 70° F., or at other desired amine temperature.

Liquid carbon dioxide is withdrawn from storage tank 48 through line 50, pressure-reducing valve 52, and line 60 to coil 28, which is contained in zone 46 of reactor-exchanger 22. Pressure-reducing valve 52 maintains the pressure within coil 28 at about 100 p.s.i.a. At the conditions imposed, zone 32 is partially filled with liquid dimethylamine, and zone 46 with liquid product. The dimethylamine in zone 32 is heated and vaporized by indirect exchange of part of the exothermic heat of reaction from reaction zone 46. The heated dimethylamine is withdrawn from zone 32 through line 34, the flow rate being controlled by valve 36, and line 42 to enter reaction zone 46 through line 44 in admixture with carbon dioxide. Similarly, vaporized and heated carbon dioxide is withdrawn from coil 28 through line 62, flow-control valve 64, and line 68 and passes via lines 70 and 44 to reaction zone 46. The dimethylamine, being maintained at a pressure equal to its vapor pressure at 70° F. in zone 32, vaporizes to form saturated vapor at these conditions, and the exit temperature of the dimethylamine from zone 32 is thereby maintained substantially constant at 70° F. Sufficient surface area is provided in carbon dioxide coil 28, immersed in the reaction mixture, to permit the carbon dioxide to vaporize and approach the reaction temperature. Therefore, the carbon dioxide leaving coil 28 is also maintained at a substantially constant temperature, and the reactants are continuously furnished to reaction zone 46 at a constant temperature with a minimum of automatic control.

Upon entering reaction zone 46, the reactants are thoroughly mixed and at least partially reacted in and around baffle 26 at the bottom-most portion of the zone. The remainder of zone 46 provides sufficient residence time to assure completion of the reaction and also provides an excess of heat-transfer surface for exchange of heat through the wall of column 24 into the dimethylamine annular zone 32.

Heat transfer from zone 46 to coil 28 and zone 32 is most efficient if a liquid phase is maintained in zone 46, but the amount of heat taken up by the reactants in the exchange zones is not sufficient to condense the reaction product in zone 46. Therefore, condensed and cooled reaction product is returned to the reaction zone to cool the newly-formed reaction product just to its condensation temperature, but does not completely condense it. In other words, the returned product removes all of the superheat from the newly-formed product vapors and a body of boiling product is maintained in the reaction zone. The gaseous product, along with unconsumed carbon dioxide, which is provided to the reaction zone in excess, and traces of unconsumed dimethylamine are removed overhead from reaction zone 46 through line 71, condenser 74, and line 76 to separator 78.

In separator 78 a portion of the gaseous carbon dioxide is removed from the reaction product, while the balance is removed in distillation column 126, as described hereinafter. Liquid dimethylammonium dimethylcarbamate product, containing dissolved and entrained carbon dioxide, is withdrawn from separator 78 through line 98, line 116, liquid-level control valve 118 and line 124 to column 126, wherein the carbon dioxide is separated from the product. Heat is provided by suitable means such as steam-coil 128. The purified product is withdrawn through line 132. Stripped carbon dioxide passes through line 147, which joins line 82 to form stream 90, is compressed by compressor 92, and is recycled via line 96 to join line 70.

As the residual pressure in storage tank 10 decreases because of the withdrawal of dimethylamine, the remaining amine expands and its energy content diminishes. Consequently, since a constant amount of amine with decreasing heat content in passing through zone 32, more heat must be supplied to vaporize the liquid amine in this zone. Similarly, the energy content of the carbon dioxide being withdrawn from tank 48 also decreases, and the expanded carbon dioxide in coil 28 draws more heat from the reactants in zone 46. In order to satisfy the increasing heat requirement, more heat must flow from zone 46 to zone 32, but the amount of heat which can be transferred in this manner is limited by the amount of surface covered by the amine. As the amount of heat transferred becomes insufficient, the amine level 160 in zone 32 rises until adequate surface is covered and the increased heat demand is satisfied. When the demand is satisfied, the amine level again becomes constant, and the process continues. In practice, the amine level will constantly rise because the pressure in the storage tank constantly decreases, but it can be seen that the present process very adequately satisfies the varying heat demand by the extremely simple expedient of maintaining the pressure on zone 32 constant at the vapor pressure of the amine at the desired reaction inlet temperature. By removing a large portion of the heat of reaction from zone 46 in this fashion, the cooling requirements of condenser 74 are greatly reduced, substantial separation of carbon dioxide is achieved in separator 78, and the load on the column 126 is maintained at a low level.

Although coil 28 may also be placed within zone 32, it has been found in accordance with this invention that by placing the carbon dioxide preheating coil 28 inside reaction zone 46, advantage is taken of the higher temperature within this zone and a smaller surface is required to transfer the required amount of heat. When conducting certain reactions where a portion of this product condenses in zone 46, the condensed product can be withdrawn directly to separator 78. Pump 100 is provided to permit operating column 126 at a slightly elevated pressure if desired. Consequently, pressure-control valve 148 is placed in line 147. Liquid-level controller 112, operating valve 108, is for the purpose of controlling the liquid level in reaction zone 46 if the reaction is such that the product would otherwise be substantially all in the vaporous form. In order to maintain a liquid phase in reaction zone 46 for the purpose of better heat transfer to coil 28 in zone 46, the cooled product may be introduced through line 106 controlled by liquid-level control-valve 108.

In order to further illustrate the invention, the following specific example is given which is on the basis of the manufacture of 100 lbs./hr. of dimethylammonium dimethyl carbamate. In the tabulation given, the "initial condition" means that the carbon dioxide and dimethylamine feed tanks are full as at the beginning of the reaction. As these supply tanks are emptied, the heat requirements change due to partial evaporation of the residual reactants in the feed tanks. The "final condition" applies when the feed tanks are nearly empty. The table gives the flow rates in the various parts of the apparatus in addition to the initial and final conditions during the reaction to prepare dimethylammonium dimethylcarbamate.

| Condition | Initial | Final |
|---|---|---|
| fresh feed— | | |
| $CO_2$: lb./100 lb. DADC | 32.8 | 32.8 |
| B.t.u./100 lb. DADC to raise to 120° F., 100 p.s.i.a. | 3,050 | 4,330 |
| Heat transfer surface required, sq. ft./100 lb. DADC/hr | 2.7 | 3.8 |
| DMA: lb./100 lb. DADC | 67.2 | 67.2 |
| B.t.u./100 lb. DADC to raise to 70° F. at 18 p.s.i.a. | 16,680 | 17,760 |
| Heat transfer surface required, sq. ft./100 lb. DADC/hr | 5.5 | 5.9 |
| Recycle Gas: lb./100 lb. DADC | 12.4 | 11.95 |
| Recycle Liquid: lb./100 lb. DADC | 37.95 | 22.30 |
| Reactor Feed: lb./100 lb. DADC | 150.35 | 134.25 |
| B.t.u./100 lb. DADC to raise to 140° F., at 16.2 p.s.i.a. (Fresh feed plus recycle) | 29,500 | 29,500 |
| Heat of Reaction at 140° F., B.t.u./100 lb. DADC formed | 29,500 | 29,500 |

The reactor is in correct heat balance with the indicated amount of recycle, which must become heated and vaporized to carry away excess exothermic heat of reaction. Should the reactor become unbalanced, the liquid level in reaction zone 46 rises or falls, and liquid-level control 112 closes or opens control-valve 108 sufficiently to change the quantity of crude product recycled to bring the reactor into balance again. With a constant level in zone 46 as indicated at 114, a constant portion of carbon dioxide preheater coil 28 is exposed to the reaction liquid. As the preheating duty changes, the temperature of the effluent carbon dioxide also changes somewhat. This is counter-balanced by readjusting pressure controller 14 to change the boiling point of the dimethylamine in zone 32. Accordingly, it is seen that the temperature of the combined reactants in stream 44 is easily maintained constant. Flow-controller 36 delivers dimethylamine at a constant rate throughout the reaction. If for any reason too much dimethylamine is evaporated within zone 32, the pressure tends to rise therein and pressure-controller 14 reduces the flow through line 20 to zone 32. This causes liquid level 160 in zone 32 to drop. With a reduced height of liquid in zone 32, the heat-transfer area is reduced, and the amount of dimethylamine vaporization is restored to a balance. Balance in zone 32 is also restored by a reverse sequence if insufficient vapor is generated for the flow conditions therein.

The reaction temperature is maintained at the boiling point of dimethylammonium dimethylcarbamate. The boiling point of dimethylammonium dimethylcarbamate at atmospheric pressure is 140° F. Reaction temperature may be increased by increasing reaction pressure. In general, an excess of carbon dioxide is used or maintained throughout the reaction in zone 46, which excess may be from about 5 to 20% over stoichiometric requirements, and is preferably maintained at about 10% over stoichiometric requirements. It is seen from this description that the invention provides a system whereby the heat required to bring the mixture of dimethylamine and carbon dioxide to desired reaction inlet temperature, and the cooling necessary to control the exothermic reaction are provided in a single reactor with a minimum of process control.

What is claimed is:

1. In the process of controlling the exothermic reaction of dimethylamine and carbon dioxide at a particular reaction temperature wherein said reactants are separately maintained in pressurized sources and combined as gases in an exothermic reaction zone to form liquid dimethylammonium dimethylcarbamate, the improvement comprising subjecting said reactants to individual initial expansion and cooling at pressures less than said pressurized sources and greater than the reaction pressure to cool same to temperatures less than said particular reaction inlet temperature, contacting said dimethylamine in partially expanded condition in indirect heat exchange with said reaction zone in an expansion zone, contacting said carbon dioxide in partially expanded condition in indirect heat exchange with said reaction zone in a second expansion zone, mixing said reactants from said expasion zones at said particular reactor inlet temperature not greater than said particular reaction temperature, conducting the mixture to said reaction zone, maintaining said reaction zone under condition whereby the dimethylammonium dimethylcarbamate product is maintained at its boiling temperature in contact with liquid dimethylammonium dimethylcarbamate, and regulating the amount of said heat exchange imparted to said expansion zones by said exothermic reaction whereby the expanded dimethylamine and carbon dioxide are maintained at their vapor pressures at the particular reaction temperature and said entering mixture at a substantially constant composition at said particular inlet reaction temperature.

2. The process in accordance with claim 1 in which a portion of said product, dimethylammonium dimethylcarbamate, is removed from said reaction zone, cooled to a temperature below the condensation temperature thereof and above the condensation temperature of unconsumed dimethylamine and carbon dioxide reactants, a portion of said cooled and condensed product is recycled to said reaction zone to absorb a portion of the heat of reaction and the separated unconsumed dimethylamine and carbon dioxide are mixed with said reaction mixture to maintain said particular inlet reaction temperature.

3. In the process of controlling exothermic reactions between dimethylamine and carbon dioxide reactants from separate sources, which reactants are gaseous at reaction conditions wherein said reactants are maintained in liquid form by the application of pressures above atmospheric on said sources and said reactants are combined as gases in a single exothermic reaction zone to form dimethylammonium dimethylcarbamate as a reaction product in the liquid phase at atmospheric conditions, the improvement comprising subjecting said reactants to individual initial expansion and cooling at pressures less than storage pressure and greater than reaction pressure, said reactants thereby being cooled to temperatures less than a reaction inlet temperature of about 70° F., contacting said partially expanded dimethylamine in indirect heat exchange in an expansion zone external of said reaction zone, contacting said partially expanded carbon dioxide in indirect heat exchange in a second expansion zone within said reaction zone, mixing said reactants from said external and internal expansion zones at said reactor inlet temperature, conducting the mixture to said reaction zone, maintaining said reaction zone at a temperature of about 140° F. and a pressure such that the dimethylammonium dimethylcarbamate product is maintained at its boiling temperature in contact with a liquid phase of dimethylammonium dimethylcarbamate and regulating the amount of said heat exchange imparted to said internal and external expansion zones by said exothermic reaction whereby the expanded reactants therefrom are maintained at their vapor pressures at said reaction temperature and said entering mixture is maintained at a substantially constant composition at said inlet reaction temperature.

4. The process in accordance with claim 3 in which a portion of said gaseous dimethylammonium dimethylcarbamate is removed from said reaction zone, same is condensed and recycled to said reaction zone to absorb a portion of the heat of reaction and maintain said reaction temperature.

5. The process in accordance with claim 3 in which unconsumed dimethylamine and carbon dioxide are separated from said product and mixed with said reaction mixture to maintain said inlet reaction temperature.

6. The process in accordance with claim 3 in which said reaction zone is maintained at a pressure of 16.2 p.s.i.a., said dimethylamine is heated to 70° F. and said carbon dioxide is heated to about 120° F.

7. The process in accordance with claim 6 in which the initial storage pressure on said source of dimethylamine is about 35 p.s.i.a. at 77° F. and the initial storage pressure on said source of carbon dioxide is about 950 p.s.i.a. at 77°F.

8. The process in accordance with claim 7 in which said first expansion of dimethylamine is to a pressure of about 18 p.s.i.a., with a resulting temperature decrease to about 57° F., and said first expansion of carbon dioxide is to a pressure of about 100 p.s.i.a., with a resulting temperature decrease to about −58° F.

9. The process of producing dimethylammonium dimethylcarbamate which comprises maintaining a pressurized source of dimethylamine at about 35 p.s.i.a. at 77° F. and a pressurized source of carbon dioxide at about 950 p.s.i.a. at 77° F., separately expanding said dimethylamine to a pressure of about 18 p.s.i.a. and a temperature of about 57° F., separately expanding said carbon dioxide to a pressure of about 100 p.s.i.a. and a temperature of about −58° F., passing said dimethylamine in indirect heat exchange within an expansion zone surrounding a single reaction zone having a common surface therewith to a temperature of about 70° F., passing said carbon dioxide into a second expansion zone completely contained within said reaction zone to a temperature of about 120° F., withdrawing gaseous dimethylamine and gaseous carbon dioxide from said expansion zones, mixing said gaseous reactants to form a reaction mixture of at least stoichiometric proportions having a temperature of about 70° F., conducting said mixture into said reaction zone, regulating the amount of heat exchange within said expansion zones to maintain said reaction inlet temperature of 70° F. and said reaction temperature at about 140° F. whereby said product dimethylammonium dimethylcarbamate is maintained in the liquid phase at its boiling point and said expanded reactants are maintained at their vapor pressures, withdrawing gaseous dimethylammonium dimethylcarbamate from said reaction zone and condensing and cooling same, returning a sufficient amount of said cooled dimethylammonium dimethylcarbamate to said reaction zone to maintain a liquid level therein sufficient to maintain said heat exchange rates, inlet reaction temperature and reaction temperature.

References Cited in the file of this patent
UNITED STATES PATENTS

| | | |
|---|---|---|
| 2,010,841 | Bender | Aug. 13, 1935 |
| 2,139,351 | Bejarano | Dec. 6, 1938 |
| 2,154,795 | Westenberg | Apr. 18, 1939 |
| 2,635,124 | Hunter et al. | Apr. 14, 1953 |